United States Patent
Sengupta (10) Patent No.: US 12,277,773 B2
(45) Date of Patent: Apr. 15, 2025

(54) ACTIVE PRESENCE DETECTION WITH DEPTH SENSING

(71) Applicant: Kuntal Sengupta, Winchester, MA (US)

(72) Inventor: Kuntal Sengupta, Winchester, MA (US)

(73) Assignee: IMPRIVATA, INC., Lexington, MA (US)

( * ) Notice: Subject to any disclaimer, the term of this patent is extended or adjusted under 35 U.S.C. 154(b) by 0 days.

(21) Appl. No.: 18/242,707

(22) Filed: Sep. 6, 2023

(65) Prior Publication Data

US 2024/0020980 A1    Jan. 18, 2024

Related U.S. Application Data

(63) Continuation of application No. 15/836,238, filed on Dec. 8, 2017, now Pat. No. 11,798,283, which is a continuation of application No. 13/920,613, filed on Jun. 18, 2013, now Pat. No. 10,002,297.

(60) Provisional application No. 61/715,515, filed on Oct. 18, 2012, provisional application No. 61/661,926, filed on Jun. 20, 2012.

(51) Int. Cl.
*G06V 20/52* (2022.01)
*G06F 21/31* (2013.01)
*G06F 21/32* (2013.01)
*G06F 21/83* (2013.01)

(52) U.S. Cl.
CPC ............ *G06V 20/52* (2022.01); *G06F 21/316* (2013.01); *G06F 21/32* (2013.01); *G06F 21/83* (2013.01); *G06F 2221/2111* (2013.01)

(58) Field of Classification Search
USPC .......................................................... 348/46
See application file for complete search history.

(56) References Cited

U.S. PATENT DOCUMENTS

| | | | |
|---|---|---|---|
| 5,554,983 A | 9/1996 | Kitamura et al. | |
| 5,991,429 A | 11/1999 | Coffin et al. | |
| 6,690,414 B2 | 2/2004 | Lyons et al. | |
| 7,120,278 B2* | 10/2006 | Sukegawa ............ | G06V 40/172 382/209 |
| 2004/0052418 A1 | 3/2004 | Delean | |
| 2005/0058337 A1 | 3/2005 | Fujimura et al. | |
| 2006/0187305 A1 | 8/2006 | Trivedi et al. | |

(Continued)

FOREIGN PATENT DOCUMENTS

| | | |
|---|---|---|
| WO | 1999064961 | 12/1999 |
| WO | 2005050972 | 6/2005 |

OTHER PUBLICATIONS

Xiao, Qinghan, and Xue Dong Yang. "A facial presence monitoring system for information security." Computational Intelligence in Biometrics: Theory, Algorithms, and Applications, 2009. CIB 2009. IEEE Workshop on. IEEE, 2009 (Year: 2009).*

(Continued)

*Primary Examiner* — Mikhail Itskovich
(74) *Attorney, Agent, or Firm* — Morgan, Lewis & Bockius LLP (57) ABSTRACT

In vision-based authentication platforms for secure resources such as computer systems, false positives and/or false negatives in the detection of walk-away events are reduced or eliminated by incorporating depth information into tracking authenticated system operators.

20 Claims, 4 Drawing Sheets

(56) References Cited

U.S. PATENT DOCUMENTS

2007/0182818 A1 8/2007 Buehler
2007/0236343 A1 10/2007 Becksted et al.
2010/0011136 A1 5/2010 Kelly et al.
2011/0286638 A1 11/2011 Tedesco et al.

OTHER PUBLICATIONS

Xiao, Qinghan, and Xue Dong Yang. "A facial presence monitoring system for information security." Computational Intelligence in Biometrics: Theory, Algorithms, and Applications, 2009. CIB 2009. IEEE Workshop on. IEEE, 2009.

Purcher, Jack, "Apple Envisions Face & Presence Detection Security for iOS Devices", Patently Apple, (Dec. 29, 2011 ), available online at http://www.patentlyapple.com/patently-apple/2011 / 1 2/apple-envisions-face-presence-detection-security-for-ios-devices.html (last accessed on Nov. 14, 2013).

"OneSign Secure Walk-Away", Imprivata.com, (2013), available online at http://www.i m privata.com/products-and-solutions/ authentication-man agement/onesig n-secu re- walk-away (last accessed on Nov. 13, 2013).

\* cited by examiner

ACTIVE PRESENCE DETECTION WITH DEPTH SENSING

CROSS-REFERENCE TO RELATED APPLICATIONS

This application is a continuation of U.S. patent application Ser. No. 15/836,238, filed Dec. 8, 2017, now U.S. Pat. No. 11,798,283, which is a continuation of U.S. patent application Ser. No. 13/920,613, filed Jun. 18, 2013, now U.S. Pat. No. 10,002,297, which claims priority to and the benefit of U.S. Provisional Patent Application Nos. 61/661,926, filed on Jun. 20, 2012, and 61/715,515, filed Oct. 18, 2012. The entire disclosure of each of these references is hereby incorporated herein by reference.

TECHNICAL FIELD

The invention relates generally to systems and methods for detecting the presence or absence of objects, and more specifically to the detection and tracking of operators as they interact with secure systems.

BACKGROUND

As computer systems become ubiquitous in both the home and industry, the ability for any one individual to access applications and data has increased dramatically. Although such ease of access has streamlined many tasks such as paying bills, ordering supplies, and searching for information, the risk of providing the wrong data or functionality to the wrong person can be fatal to an organization. Instances of data breaches at many consumer-product companies and the need to comply with certain statutory measures (e.g., Health Insurance Portability and Accountability Act (HIPAA), Child Online Protection Act (COPA), Sarbanes-Oxley (SOX), etc.) have forced many companies to implement much stricter system access policies.

Historically, computer systems have relied on so-called "logical" authentication in which a user is presented a challenge screen and must provide one or more credentials such as a user ID, a password, and a secure token. In contrast, access to physical locations (e.g., server rooms, file rooms, supply rooms, etc.) is typically secured using physical authentication such as a proximity card or "smart card" that, when presented at a card reader, results in access to the room or area. More recently, these two authentication techniques have been incorporated into single-system access authentication platforms. When used in conjunction with other more complex identification modalities such as biometrics, it has become very difficult to gain unauthorized access to secure systems.

Granting initial access is only half the story, however. Once a user has presented the necessary credentials to gain entry to a secure computer system, for example, he may circumvent the strict authentication requirements by allowing other users to "piggy-back" on his credentials. Users departing from an authenticated session may fail to terminate the session, leaving the session vulnerable to unauthorized access. As a result, sensitive data may be exposed to access by unauthorized individuals.

Many currently available commercial solutions for detecting user presence and departure suffer from significant practical limitations. For example, when "timeouts" are used to terminate system access if keyboard or mouse activity is not detected during a pre-set period of time, the operator's physical presence is insufficient to retain access, and erroneous termination may result in cases of extended passive interaction (e.g., when the user reads materials on the screen). Further, such systems cannot discriminate between different users, and a timeout period introduces the potential for unauthorized use during such period. Approaches that use radio-frequency (RF) or similar token objects to detect user departure based on an increase in distance between the token object and a base transceiver suffer from an inability to reliably resolve the distance between the token and receiver, which can result in a restricted or unstable detection zone. Furthermore, the token objects can be readily swapped or shared.

Yet another solution involves detecting and tracking an operator visually. For example, operator detection and/or identification may be achieved using one or more video cameras mounted to the computer terminal in conjunction with object-recognition techniques (e.g., based on analysis of one or a sequence of images) to detect and locate a single operator, which generally involves differentiating the operator from non-operators and the background scene. Once an operator is identified, her movements within a predefined detection zone, such as a pyramidal volume extending radially outward from the secure computer terminal, are tracked to determine when and whether she interacts with the secure system. In certain implementations, this is done without having to continually re-identify the operator, instead relying on following the motion of the operator with the help of computer-vision motion analysis and other techniques. The position and size of the operator may be tracked to detect when she exits the detection zone, which is called a "walk-away event." The reappearance of the operator after an absence from the detection zone may also be detected. For example, a stored exemplar of previously identified operators may be used to detect and authenticate the operator upon reappearance and within a pre-defined time window.

One problem associated with currently available visual presence-detection systems is their reliance on relative face sizes to identify the operator among multiple people detected in the field of view of the camera. While, on average, the operator's face (due to his proximity to the camera) appears largest in the image, variations in people's head sizes as well as different hair styles and head covers that occlude the face to varying degrees can result in the misidentification of the operator. An even greater problem of conventional systems is the high rate of false alarms signaling walk-away events. This issue arises from the use of color, intensity, and/or gradient information (or similar two-dimensional cues) in the images to compare tracked foreground patches in previous image frames to query patches in the current frame. If background objects have cues similar to those of the tracked foreground object, which is generally true for faces, false matches are frequently generated—e.g., the face of a person in the background may be incorrectly matched to the face of the operator in a previous image. Thus, when the person in the background subsequently leaves the scene, a walk-away event is falsely declared, and, conversely, when the person in the background remains in the scene, the operator's departure goes unnoticed by the system.

A need exists, accordingly, for improved visual approaches to presence detection and, in particular, for systems and techniques that detect walk-away events more reliably.

SUMMARY

Embodiments of the present invention relate to systems and methods that use depth information—alone or, e.g., in conjunction with color and/or intensity gradient information—to identify and track operators of secure systems more reliably and, thus, avert or reduce both false positives and false negatives in the detection of walk-away events (i.e., the false detection of walk-away events as well as the failure to detect actual walk-away events). Depth-sensing cameras based on various technologies (e.g., stereo cameras, time-of-flight cameras, interferometric cameras, or cameras equipped with laser rangefinders) are commercially available, and may readily be mounted at or near the computer terminal (or other secure system), replacing the traditional desk-top cameras used in existing visual presence detection systems. Using information about depth, which corresponds to distances of objects from the computer terminal, the face of an operator at the terminal can be more readily distinguished from faces of persons in the background.

Various embodiments in accordance herewith employ face detection to find an operator within a three-dimensional detection zone, followed by head tracking to monitor the operator's movements and detect his departure from and/or reentry into the detection zone. The detection zone may have a depth boundary (or "depth threshold"), i.e., it may be limited to a specified maximum distance from the terminal. The boundary may, for example, correspond to a distance from the terminal beyond which an operator would ordinarily not be expected, or a somewhat larger distance beyond which people would not be able to discern normally sized text or other screen content by eye. In some embodiments, face finding is limited at the outset to image portions whose associated depth values are below the depth threshold. Alternatively, faces may be detected in the images first, and then filtered based on the depth threshold. Among multiple faces within the detection zone, the face that is closest to the terminal may be deemed to be that of the operator. In addition to utilizing absolute distance from the terminal to distinguish between an operator and a person in the background, the system may also use relative depth information as a "spoof filter," i.e., to discriminate between the three-dimensional surface of a real-life face and a two-dimensional, flat image of a face.

During head tracking, depth information associated with a collection of tracked features may be used to increase tracking robustness and frame-to-frame depth consistency, and thus avoid tracking errors that involve jumps from the operator's face to the face of another person located farther away, e.g., beyond the detection zone. For example, based on the assumption that the operator does not move away from the screen at a speed faster than a certain maximum speed (consistent with the speed range of human motion), the difference in the depth of the tracked face or head between successive image frames may be required to fall below a corresponding threshold, or else a tracking error is declared. In some embodiments, the collection of tracked features is from time to time re-initiated based on re-detection of the face or detection of a head-shoulder region. Depth consistency between the detected face or head-shoulder region and the tracked features may, in this approach, ensure that the re-initiation does not cause an erroneous jump to another person.

In some implementations, following the detection of an operator's face, a biometric signature of the face (e.g., a face template, or a list of features derived therefrom) is collected and stored in memory. This signature may later be used for re-authentication of a user who has left the terminal and subsequently returned. Further, face templates may be repeatedly captured and saved during head tracking, e.g., whenever the face is re-detected for purposes of re-initiating the tracked feature collection. The templates may be indexed on the basis of face posture, as computed, e.g., using the three-dimensional coordinate values on salient points or regions of the face, such as the eyes, nose, mouth, etc. This facilitates faster re-authentication and reduces the vulnerability of the procedure to false acceptances.

Accordingly, in one aspect, the invention is directed to a computer-implemented method for monitoring an operator's use of a secure system. The method includes acquiring images with a depth-sensing camera system co-located with an operator terminal of the secure system, analyzing one or more of the images to determine whether a face is (or faces are) present within a three-dimensional detection zone having a depth boundary relative to the terminal, and, if so, associating that face (or one of the faces) with an operator, and thereafter tracking the operator between successive images to detect when the operator leaves the detection zone. Tracking the operator is based, at least in part, on measured depth information associated with the operator, and may serve, e.g., to discriminate between the operator and background objects (such as persons in the background).

A "secure system" herein generally means an individual computer or a network of computers with restricted access, and an "operator terminal" refers to any means of accessing the secure system—e.g., a terminal of the system, a computer (e.g., a client computer) linked to the system via a LAN or WAN, or a device connected to the system via the Web. A "depth-sensing camera system," as used herein, refers to a system that includes one or more cameras and such other hardware and/or software as is necessary to obtain three-dimensional image information. For example, the depth-sensing camera system may be a stereo camera system including two spaced-apart image sensors, a single camera operating in conjunction with a structured light source to infer depth information from projections of the structured light onto objects of interest, a system including a camera and depth-sensing sensors, or other suitable arrangement. The depth-sensing camera system is considered to be "co-located" with the operator terminal of the secure system for purposes hereof if (i) a region of interest, i.e., the "detection zone" in front of the secure system (i.e., in front of the screen and/or such other input/output components of the secure system as are generally used by a system operator) is within the field of view of the camera(s) and (ii) the camera system is arranged in a known geometric relation to the secure system so that the location of detected objects (e.g., users) relative thereto may be conveniently determined. In some embodiments, the camera(s) are placed directly at the secure system (e.g., mounted on or otherwise attached to the screen); however, a camera placed, e.g., above and in a region behind the screen may also be "co-located" for purposes hereof as long as it facilitates monitoring the detection zone in accordance herewith. By "secure system" is meant the actual system itself, or a terminal, display or other component of the system with which the user interacts. "Measured depth information," as used herein, is depth information directly ascertained by the depth-sensing camera system, as distinguished from depth information as inferred from two-dimensional image data based on heuristics, such as, e.g., the apparent size of a face.

The method may include collecting a biometric signature of a face upon association of that face with the operator. Further, it may involve issuing an alarm or logging out the operator upon detecting that the operator leaves the detection zone, and, optionally, thereafter analyzing the images to determine, based on detection of a face associated with the operator, when the operator has re-entered the detection zone.

The determination whether a face is present within the detection zone may be made by detecting faces in the images and thereafter computationally determining which, if any, of the detected faces are present within the detection zone, or, alternatively, by detecting faces only within portions of the image corresponding to the detection zone. Determining whether a face is in the detection zone may also involve discriminating between faces and two-dimensional images thereof. In some embodiments, associating a face with the operator includes identifying, among a plurality of faces present within the detection zone, the face closest to the secure system and computationally associating that face with the operator.

Tracking the operator may involve tracking a collection of trackable key features (e.g., key points, lines, or patches) associated with the operator between the successive images. The key features may generally be any computationally trackable features associated with fixed physical points or regions on the operator. The key features may be tracked at least in part based on depths associated therewith. Specifically, in some embodiments, tracking the key features includes matching the key features between the successive images based at least in part on the associated depths, and in some embodiments, it involves filtering identified matches of key features between the successive images based at least in part on the depths. Key-feature tracking may be accomplished, e.g., using optical-flow analysis.

In some embodiments, the key features are selected based on detection of the operator's face. Further, operator tracking may involve repeatedly or periodically restarting the tracking based on re-detection of the face and/or detection of a head-shoulder portion associated with the operator. The face re-detection and/or detection of the head-shoulder portion may be based at least in part on depth information. In certain embodiments, face templates are saved repeatedly upon re-detection of the face for subsequent use during re-authentication. The face templates may be indexed based at least in part on face posture as determined from three-dimensional information contained therein.

In another aspect, the invention relates to an access-control system for monitoring an operator's use of a secure system. In various embodiments, the access-control system includes a depth-sensing camera system co-located with an operator terminal of the secure system, and a computational facility including a processor and associated memory. The memory stores processor-executable instructions for (i) analyzing one or more of the images to determine whether at least one face is present within a three-dimensional detection zone including a depth boundary relative to the operator terminal, and, if so, associating one of the at least one face with an operator, and (ii) following association of a detected face with the operator, tracking the operator between successive ones of the images based, at least in part, on measured depth information associated with the operator to detect when the operator leaves the detection zone. The system may further include a database storing face templates indexed based, at least in part, on face posture as determined from three-dimensional information contained therein, and the instructions stored in memory may include an authentication application for authenticating the operator based on the associated detected face and the database.

The instructions stored in memory may include instructions to (i.e., their execution may cause the processor to) use the measured depth information to discriminate between the operator and background objects; first detect faces in the images and thereafter computationally determine which, if any, of the detected faces are present within the detection zone, or, alternatively, detect faces only within portions of the image corresponding to the detection zone; identify, among a plurality of faces present within the detection zone, the face closest to the secure system and computationally associate that face with the operator; track a collection of trackable key features associated with the operator between the successive images based, at least in part, on depths associated therewith (e.g., by matching the key features between the successive images based at least in part on the depths, or by filtering identified matches of key features between the successive images based at least in part on the depths); and/or periodically restart the tracking based on depth-based re-detection of the face and/or detection of a head-shoulder portion associated with the operator. The instructions may, further, include a spoof filter for discriminating between faces and two-dimensional images thereof.

BRIEF DESCRIPTION OF THE DRAWINGS

The foregoing will be more readily understood from the following detailed description, in particular, when taken in conjunction with the drawings, in which.

DETAILED DESCRIPTION

Figure 1:
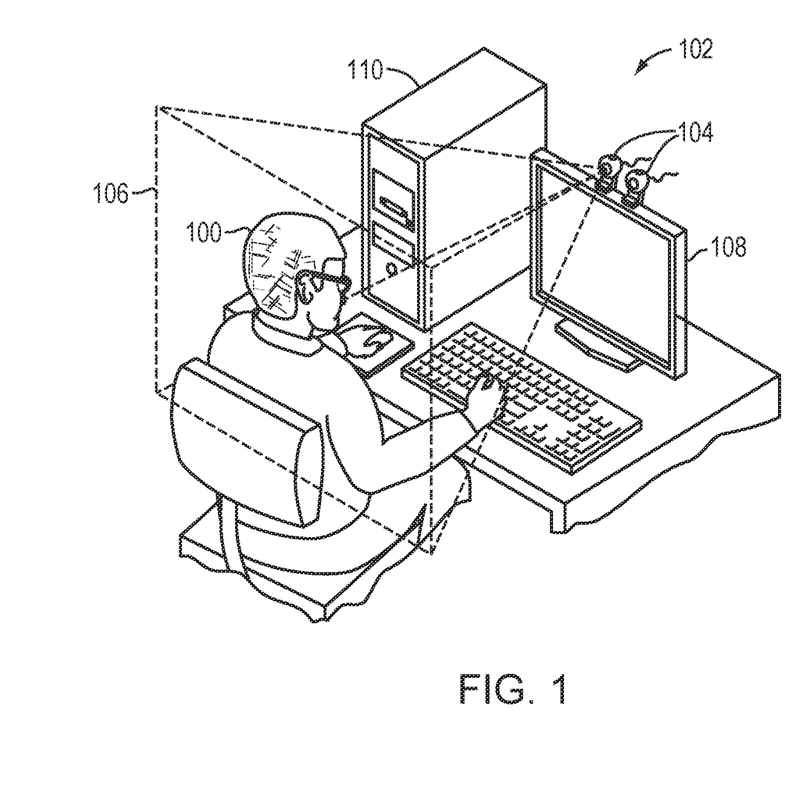
FIG. 1 is a perspective drawing illustrating an operator's use of a secure system and the detection zone monitored by cameras co-located with the system in accordance with various embodiments.

FIG. 1 depicts an exemplary scenario in which systems and methods in accordance with the present invention may be advantageously used. As shown, an operator 100 works at a computer terminal or workstation 102, interacting with it in an active and/or passive manner. Active interaction occurs when the operator directly conveys information to the computer, e.g., by pressing keys on a keyboard, moving a mouse, or speaking into a microphone. During passive interaction, the operator is within a spatial zone adjacent to or surrounding the terminal, but has no direct interaction with the system; for example, the operator may simply read material on a monitor or listen to audio without using any input devices.

One or more video cameras 104 monitor a spatial zone 106 (hereinafter also referred to as the "detection zone") in which the operator will ordinarily be located while using the computer. The camera(s) 104 are co-located with the computer screen 108, and are typically oriented in the same direction as the computer screen 108 (facing the operator 100). For example, the camera(s) 104 may be mounted on top of, or otherwise attached to or integrated with, the screen 108, or mounted elsewhere but capable of monitoring the detection zone 106. The images captured by the camera(s) 104 may be sent periodically or in a continuous fashion to a computer, where a computer processor executes one or more image-processing algorithms (implemented as series of computer-executable software instructions) to interpret them so as to automatically detect, locate, and track the operator. Typically, this image-processing functionality is integrated into the secure system's computer 110 itself; alternatively, however, it may be provided by a separate computer (e.g., a suitably programmed general-purpose computer or a special-purpose computer integrated with the cameras 104) in communication with the secure system. In some implementations, additional sensors may be employed, some being visuals sensors and some being audio, heat, or other types of sensors. Algorithms carried out by the processor may process data from these sensors to facilitate tracking the operator and distinguish the operator from inanimate objects and other non-operators.

The secure system 102 may include an authentication application through which authorized operators can log into the system to gain access to the system or, in some cases, to specific applications and/or data residing on the system. For example, in some embodiments, the operator may initially be asked for a user name and password to log onto the system; following this authentication, access will be permitted unless and until the operator leaves the detection zone, and may thereafter be re-established automatically upon re-entry of the operator into the detection zone. In some embodiments, authorized operators are authenticated automatically based on face recognition. The secure system may, for instance, store a database of face templates, or data about characteristic facial features, for all authorized users, and compare faces detected in the detection zone against this database to identify the operator.

In embodiments of the instant invention, the camera(s) 104, in conjunction with the image-processing functionality of the computer 110, have depth-sensing capabilities. For example, as illustrated, two regular video cameras 104 may be placed side-by-side, acquiring images of the detection zone 106 from slightly different angles, but such that their fields of view significantly overlap (e.g., by at least 90%). The same physical point located within the overlapping portions of the cameras' fields of view will appear at different locations within the two images. A stereo algorithm can compare pairs of images taken with the two cameras to determine the relative shift between pairs of points corresponding to the same physical point, and, using the known distance between the two cameras, derive depth by triangulation. Suitable stereo algorithms are well-known to persons of skill in the art and can be implemented without undue experimentation, e.g., in the form of software executed on a general-purpose computer. Of course, a commercially available stereo camera, optionally with embedded image-processing functionality, may also be deployed. Alternatively, any other range-sensing technology (including, e.g., time-of-flight sensors or structured-light systems, interferometric cameras, or cameras equipped with laser rangefinders) may be used. The KINECT camera (available from Microsoft Corp.), for example, senses a laser-projected light pattern to infer three-dimensional information; due to its integrated motion-capture, face-recognition, and voice-recognition capabilities, this camera is particularly suitable for use in secure systems as described herein. In general, however, the invention is not contingent upon any particular depth-sensing technology, but can be implemented using any device or combination of devices capable of measuring the distance of an object within the detection zone from the camera(s).

The spatial region 106 being monitored, i.e., the detection zone, is bounded by the field of view of the camera(s) 104, which typically corresponds to a pyramidal volume extending radially outward from the monitor. If the periphery of the field of view is far outside the area where an operator is expected to be located, the detection zone may be reduced in size to reduce the computational cost associated with image processing. Further, in various embodiments in accordance herewith, the detection zone is deliberately cut off at a specified distance from the camera (e.g., at 100 inches) by disregarding image data originating from beyond a depth-boundary at the cut-off distance, either at the outset or at some point during image processing. For example, the depth information may be used to discard all image data with associated depths exceeding the set threshold. Alternatively, rather than determining depth up-front and excluding all image data corresponding to objects beyond the detection zone, a face-recognition algorithm may operate on the original images, and a filter may be applied thereafter to all face candidates to eliminate faces beyond the detection zone. The cut-off distance is typically chosen such that, beyond this distance, an operator could not practically interact with the computer system.

The detection zone is monitored for certain events that may trigger processes such as automated log-out and automated re-authentication to the system. Examples of events that may trigger these processes include detecting a new person in the detection zone, the absence of the authenticated operator from the detection zone (detected either immediately when the operator leaves or after she has been gone for some pre-determined amount of time), and detecting the re-entry of an authenticated operator into the detection zone (typically within a predetermined period of time). In some embodiments, different types of trigger events have different associated threshold distances. For instance, the appearance of a new person may be detected anywhere within the depth-bounded detection zone, whereas the departure of the operator from the terminal may be declared as soon as the operator reaches a walk-away threshold distance within the detection zone smaller than the distance of the zone's depth boundary.

Figure 2:
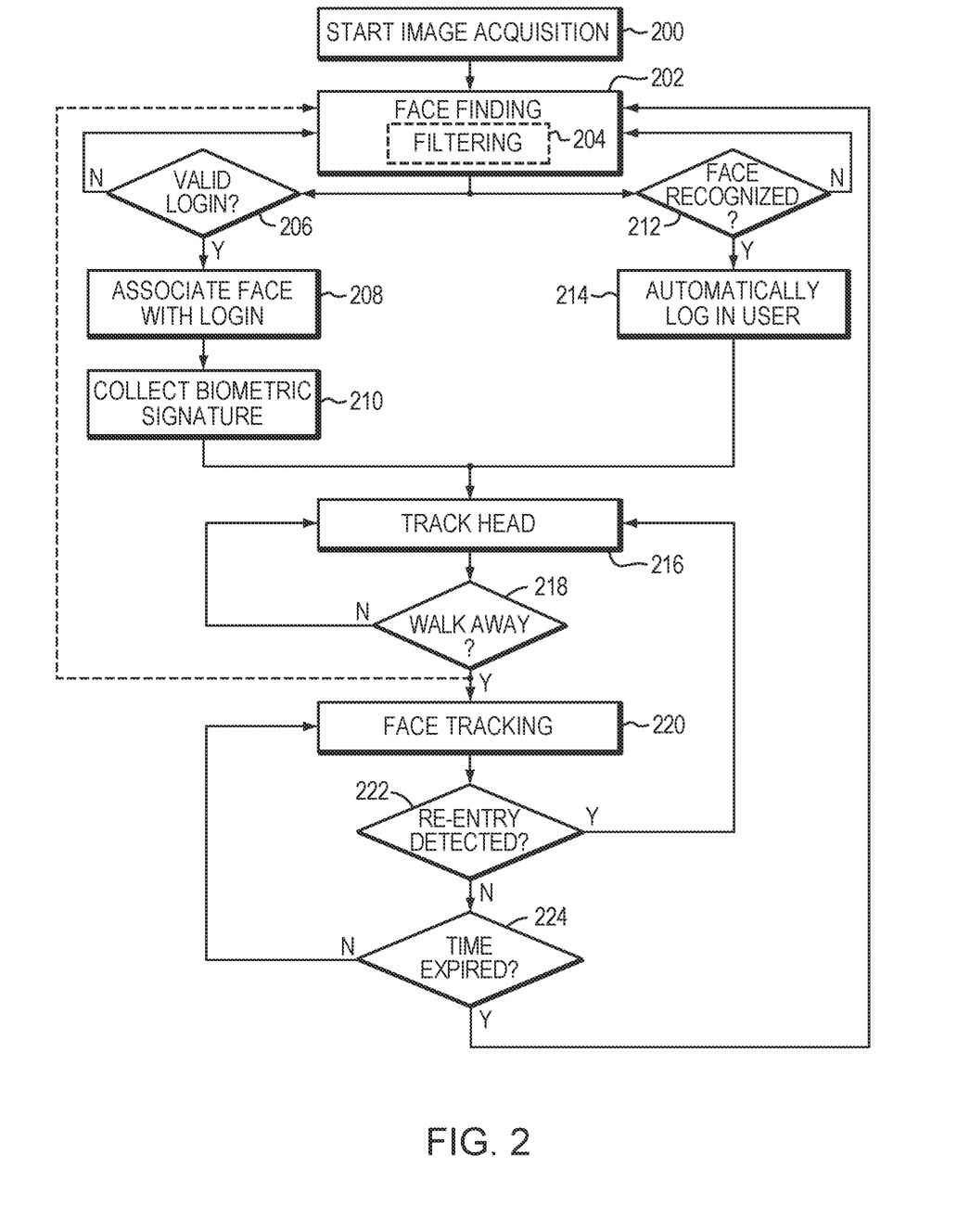
FIG. 2 is a flow chart illustrating a method for operator detection and tracking in accordance with various embodiments.

FIG. 2 illustrates an exemplary method for detecting the presence and tracking the location of an operator at a secure system. The method begins with the initiation of image acquisition (step 200) by one or more cameras connected to the secure system; the cameras, collectively and/or in combination with other sensors, have depth-sensing capability. Image acquisition may be started manually or automatically (e.g., as part of the boot-up procedure of the system). In some embodiments, to save power and computational resources, image acquisition and processing do not begin until a user has logged onto the system, e.g., via a traditional authentication application requiring user name and password. Once a stream of images from the cameras begins coming in, the system executes a face-finding algorithm to process the images and identify portions thereof that may correspond to faces (step 202). Face-finding algorithms are well-known to persons of skill in the art. A frequently used algorithm is the Viola-Jones face detector (or a modification thereof), which utilizes boosted cascades of Haar-like features to capture characteristic intensity variations between different regions of a human face (e.g., a darker region around the eyes vs. a lighter region for the cheeks) and, based thereon, discriminate between faces and other objects or the background. However, other kinds of face detectors may also be used.

The face-finding algorithm generally returns a list of candidate faces, typically with associated face locations and/or sizes. This list may sometimes contain only a single face, and at other times, when multiple people are present within the field of view of the camera(s), multiple faces.

Since face finding in accordance herewith serves to detect a system operator, the list of candidate faces may be filtered (optional step 204) to retain only candidate faces consistent with operation of the system. For example, exploiting the depth information associated with the images, faces whose locations exceed a maximum distance from the computer or terminal, i.e., fall outside a depth-bounded detection zone, may be deleted from the list. Alternatively, to avoid the computational expense associated with identifying those faces in the first place, the face-detection algorithm may limit its search to pixels within the images that have depth values below the distance threshold (i.e., fall within the depth-bounded zone). Candidate faces may also be filtered based on a number of additional criteria, such as the sizes of the faces, their location partially outside of the detection zone or in a region where no motion was previously detected, motion at too great a speed, or any overlap between faces.

In some embodiments, the system waits for an operator to log in through an authentication application (e.g., using user name and password, a proximity or other authentication card, or an RF token) (step 206), and, once a valid log-in is detected, associates the detected face, or one of several detected faces, with the logged-in operator (step 208). When the list returned by the face detector in step 202 contains multiple face candidates (after filtering, if applicable), the face closest to the screen or terminal is typically selected, again exploiting the available depth information. (Alternatively, the largest face may be selected, using size as a proxy for proximity.) Next, a biometric signature of the operator's face is collected (step 210), i.e., an image of the face, or characteristic features derived therefrom, are stored as a face exemplar for later use (e.g., for re-entry detection, as explained in detail below). In some embodiments, this involves rotating, cropping, and scaling the image to a standard size and offset relative to the locations of the left and right eyes to produce a normalized image; verifying that the face is not rotated too far relative to the camera(s); and, if the rotation is within a tolerable range, extracting a face exemplar using one or more computer vision methods such as, e.g., principal component analysis (PCA), kernel methods, statistical methods, scale-invariant feature transform (SIFT), feature extraction, or stored templates.

In some embodiments, the need for a traditional log-in is obviated by using the detected face itself for authentication. For example, a list of previously acquired face exemplars of authorized system users may be loaded into memory, and candidate faces detected by the face-finding algorithm (step 202) may be compared against these exemplars to identify matches (step 212). Face-recognition algorithms suitable for this task may utilize, for example, Haar-like templates, facial landmark identification, statistical modeling, color analysis, SIFT, or similar techniques known to persons of skill in the art. In some embodiments, face recognition is based on conventional two-dimensional face exemplars; in other embodiments, face recognition performance is improved by exploiting the system's depth-sensing capabilities to utilize the richer information content of three-dimensional face exemplars. If a face in the detection zone is recognized as belonging to one of the authorized users, the system may automatically log that user in (step 214). Whenever matches are found for multiple candidate faces, system access may be granted to one of them—typically, the operator whose face is closest to the terminal. (Alternatively, if too many people are detected too close to the screen, i.e., close enough for them to see sensitive information, the system may remain locked and, optionally, display a message requesting all but one operator to clear the detection zone.) In some embodiments, processes for authenticating an operator based on conventional credentials and for recognizing the operator based on his facial features run in parallel, allowing new users to log on in the traditional way while facilitating automatic authentication and log-in for returning users. This way, the list or database of authorized-user face exemplars can be updated seamlessly, with new users being continuously added and, if desired, old users who have not logged on for some period of time being deleted.

In certain embodiments, depth information associated with the detected faces is used in a spoof-detection filter to thwart attempts to access the system using, e.g., a photograph of an authorized user. The spoof detector uses depth profiles to distinguish between three-dimensional objects and planar structures as well as, in some instances, smooth curved surfaces (such as a cylindrically bent photograph) that do not exhibit sufficient depth detail or variation.

Once the operator is logged in and associated with a candidate face, the system starts tracking movements of her face and head (step 216) to determine when she leaves the detection zone. Motion tracking may rely on face detection, image registration, blob tracking, optical-flow analysis, or other computer-vision technique. To improve the reliability of operator tracking, in particular when the operator remains relatively still for extended periods of time or turns away from the screen, multiple approaches may be used in combination. For example, in some embodiments, face detection (as described above with respect to step 202 of FIG. 2) is used to initialize the location of the operator's face and head, but, thereafter, an optical-flow point-tracking method is employed. Advantageously, optical-flow methods—unlike face-detection algorithms—do not depend on frontal views of the operator, and thus allow following the operator's movement regardless whether the operator squarely faces the screen or not. In addition, they are generally computationally less expensive than explicit face-detection methods, facilitating operator tracking in real time with computational resources that may not suffice for real-time face detection. Tracking the operator's head (using optical flow or otherwise) usually involves correlating points or patches within successive images that correspond to the same physical point or patch. This correlation (or "mapping") step may advantageously supplement intensity and/color information with depth information to improve tracking accuracy.

Figure 3:
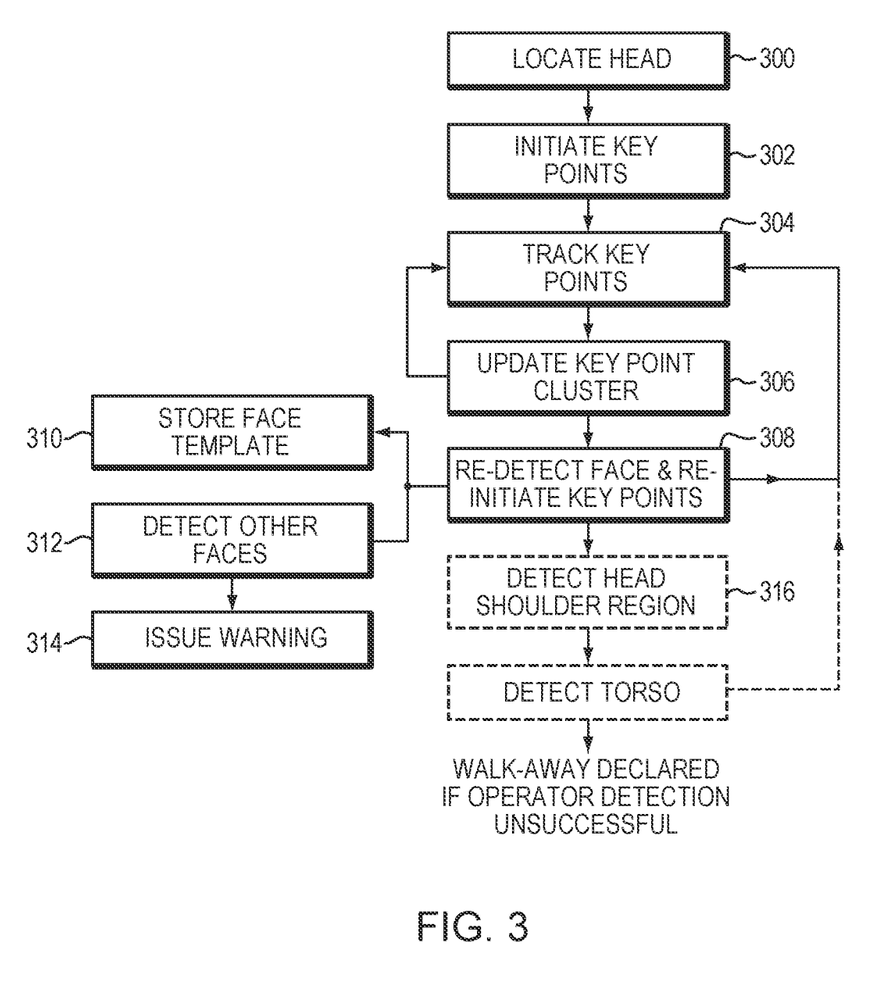
FIG. 3 is a flow chart illustrating, in more detail, a method for operator tracking in accordance with various embodiments.

FIG. 3 illustrates an exemplary hybrid method for operator tracking. In a first step 300, the initial head position and size within the image is determined based on the output of the face-detection algorithm. This step is typically executed at the time of authentication, when the operator presumably faces the screen. Next, to initiate optical-flow tracking, key points of the face and head are selected (step 302), e.g., within a rectangular bounding box around the face. These key points correspond to computationally trackable physical points on the tracked object (e.g., the head), and may be, but need not be, "interest points," i.e., visually significant points such as, e.g., the corners of the eyes, the nose tip, or points along the hair line. (Methods for interest point detection and selection are well-known to those of skill in the art.) Alternatively, physical points at the vertices of a grid overlaid onto the image, or any other selection of points on the imaged face and head, may be used as key points, as long as they are trackable across images. In some embodiments, on the order of twenty to thirty key points are used.

The key points are tracked through a stream of successive image frames (step 304). In various embodiments (e.g., the well-known Kanade-Lucas-Thomasi method), this involves block-matching small patches around the key points between pairs of successive image frames, i.e., identifying corresponding points in two images based on similarities— in terms of, e.g., intensity, color, and depth—between blocks or patches of pixels including these points. Relative depth information between pixels within a patch may be used, for example, to detect characteristic curvature. For instance, a patch around the tip of the nose may appear concave (from the point of view of the camera) with a small radius of curvature, whereas a patch on the cheek may have a larger radius of curvature, and a patch at the corner of the eye may be convex. Typically, the rate of image acquisition is so fast compared with the operator's motion that the key points undergo only small displacements (if any) between successive frames. Thus, to identify matches between frames, it generally suffices to search for a key point only in the vicinity of its location in the preceding frame; the "vicinity" may be defined in terms of a two-dimensional search region within the image frame, or in terms of a three-dimensional search region further limited by lower and upper depth boundaries.

Correlating points and/or patches (or other features, such as lines) across a sequence of images allows determining the optical flow, i.e., the direction and magnitude (in terms of displacement and/or velocity) associated with the movements of the tracked key points. Of course, as the operator moves, previously tracked key points may eventually move out of sight of the camera(s). Therefore, the collection or cluster of tracked key points is continuously updated (step 306) to delete points for which no matches are found in more recent images and add new points. Further, in some embodiments, matches are originally determined without regard to the absolute depth of key points (as opposed to relative depths of points within the patch surrounding the key point), but depth information is subsequently used to filter out implausible matches. For example, if two points in two successive image frames—while otherwise appearing to correspond to the same physical point (based on the similarity of their surrounding patches and their proximity in the image plane)—are separated in the depth direction by an amount that is inconsistent with the depth displacement of other tracked key points, that pair may be discarded. Depth, as well as in-plane location, may also be used as a consistency check applied to the entire cluster of key points. If the tracked object appears to have moved between two successive frames over a distance larger than is consistent with expected degrees and/or speeds of motion, the later frame may be disregarded as erroneous, and tracking may either proceed with the next frame or be re-initiated (as explained below with respect to step 308). Thus, tracking can utilize depth information in multiple ways: relative and/or absolute depth values can be used as factors or criteria for identifying matches between successive frames, and/or, in post-processing steps, absolute-depth disparities between successive frames can serve to filter out implausible matches at the level of individual key points or of the entire key point collection. Optical-flow (or similar tracking) methods that employ depth in one or more of these ways generally achieve higher tracking accuracy and robustness than methods that rely solely on intensity and color values.

While individual key points generally suffer from drift over time and/or erratic behavior, e.g., in response to changes in lighting, a cluster of many such points typically demonstrates overall movement consistent with the movement of the tracked object (e.g., the operator's head) over many frames. In some embodiments, the use of depth information as described above serves to increase the time period over which head tracking is stable and reliable. To further improve overall tracking robustness, the tracking algorithm may be periodically re-initiated by selecting a new collection of key points based on the re-detection of the operator's face (step 308); in other words, the tracking process may be re-started after re-synchronization with the face-detection process (as in step 202). In some embodiments, this re-synchronization happens every few seconds, corresponding to time periods of tens or hundreds of frames. For instance, in one embodiment, camera images are acquired, and key points tracked, at a rate of twenty frames per second, and the face detector is run every five seconds (i.e., after one hundred frames). The re-synchronization step uses depth information to ensure that the re-initiated key points correspond to the same tracked object (i.e., the same face) as the initial cluster of key points; i.e., assuming that any overall drift has not caused the key point cluster to move too far away from the operator's face, the key point re-initiation is based only on a face detected within a certain depth corridor around the previous key point cluster.

Periodically running the face-finding algorithm may accomplish more than improving tracking robustness. In some embodiments, a face template is stored (step 310) upon each successful re-detection of the face. Over time, a library of face templates for the same operator, with slightly varying postures (due to different orientations relative to the screen, or different facial expressions), is thus built. The templates may be sorted or indexed according to face posture as computed, e.g., from the three-dimensional coordinates of salient points of the face regions (such as the eyes, nose, chin, ears, or mouth), and may be used during later re-authentication of the operator. Periodic face finding may also serve to detect persons other than the operator in the detection zone (step 312) and, if necessary, warn the operator of their presence (step 314) or take some other appropriate action (such as automatically hiding the current screen content by running a screen saver or turning off the screen). Depth information may be used to distinguish between people far enough away to be of no concern and people who are close enough to view the screen content (e.g., looking over the operator's shoulder).

Face re-detection may be unsuccessful in some instances, e.g., when the user has turned his head and is facing away from the camera(s). In addition, the user's face may sometimes not be detected even if it is within view of the camera(s), for example, if the face posture or changed lighting conditions undermine proper performance of the face-finding algorithm. In such cases, when no match between the current key point cluster and a face in the detection zone can be found, an algorithm for detecting the operator's head-shoulder portion may be executed (step 316). This step may involve segmenting the image based on depth to identify a foreground object, fitting a suitable geometric shape or outline (e.g., an "Ω" if shape) to the object, and determining a degree of overlap between the cluster and the fitted shape(s). A match is declared when a certain fraction of key points or patches (e.g., at least half) fall within the detected head-shoulder region. From the detected head-shoulder portion, the face may then be estimated and used for stabilization and/or re-initiation. If the head-shoulder detector is likewise unsuccessful, e.g., because the operator is leaning over such that his head is outside the detection zone, a full-body detector may check whether a foreground object is still present in front of the terminal at a depth consistent with the most recent location of the key point cluster (step 318). If so, and if the operator's head re-appears in the images within a specified number of frames, tracking continues. Otherwise, the operator is deemed to have left the scene.

Returning to FIG. 2, the representative head-tracking process may run in a continuous loop until the operator is detected leaving the detection zone. The process for detecting such a walk-away condition (corresponding to step 218) may run concurrently to the head-tracking process. Detecting walk-away conditions enables the secure system to automatically close the authenticated session in a timely manner, thereby preventing unauthorized access. The detection process may involve obtaining and/or calculating the operator's head size and certain statistics pertaining to head movements (in particular, the head's center point, velocity, and variance). The next step is to detect if the center point of the operator's head is located near the edge of the image. If it is, then the process signals a walk-way event. If the center point is not located near the edge of the detection zone, then the next step in the process is to determine, based on the head's position, movement direction, and velocity, if the operator's head position is likely to be outside the zone in the next image frame. Should this be the case, the process likewise detects a walk-way event. This captures the walk-away event where the operator's head moves so quickly that it traverses the distance from well inside the detection zone to the periphery of the detection zone in a single iteration.

In various embodiments, the detection zone is confined in three dimensions. Thus, the operator is deemed to have left the detection zone, even if his head still appears in the raw images acquired by the camera(s), if his distance from the camera exceeds the specified threshold as determined from the depth information. Without depth information, detection of a walk-away in the depth direction would require other methods such as, e.g., monitoring the apparent head size and declaring a walk-away event when the size falls below a specified minimum. Such methods are, generally, computationally more expensive then monitoring a single parameter, namely, the depth of the center of the operator's head within the detection zone.

In some embodiments, once a walk-away event has been detected, a scrutiny step is carried out to either verify that the operator has, indeed, left the terminal or identify a face-tracking error (e.g., failure to detect a face that is there). In the scrutiny step, image frames acquired before and after the walk-away event are closely compared, and if the image portion corresponding to an operator's face is substantially the same, and in substantially the same (three-dimensional) location after the supposed walk-away event as before, a tracking error is declared, and the erroneously detected walk-away event is ignored.

In some instances, the operator may exit the detection zone and return at a later time. To detect such re-entries and ensure that the operator's session continues, or is re-initiated, without requiring the operator to re-authenticate through the authentication application, the system may, following the operator's departure, continue acquiring images of the detection zone and process these images in face-finding mode (step 220). When a face is found within the detection zone, it may be compared against the stored biometric signature of the operator as collected during the initial log-in (step 210), or against a library of face templates of different postures as acquired during head tracking (step 310), to determine whether that face matches the operator's face. If it does, i.e., if a re-entry event is detected (step 222), the operator's session is re-validated and the system resumes tracking the operator's head (step 216). If, on the other hand, a predetermined time period for re-entry expires before a re-entry has been detected (as determined in step 224), the operator's session may be closed, and the system may go back into its start mode, in which it waits for a new (or the same) authorized user to log on.

A binary determination whether a detected face is similar to that of the most recent system operator is computationally less expensive and generally has a lower error rate than the facial recognition of one among many users (as is required, e.g., for vision based authentication in step 212). Nonetheless, in some embodiments, the system allows multiple users to log on in turn and run their respective sessions in parallel, and tracks walk-away and re-entry events separately for each user. For example, a first user may log on and, after a while, leave the terminal without logging out. The system then simultaneously looks for re-entry events as well as new users accessing the system (as indicated by the dashed arrow back to step 202). A second user may log on and, likewise, leave the terminal after some time, followed by a third user logging on, etc. If any of the users returns within a re-entry time window measured from the time of his respective exit, the system automatically re-validates that user's session. To facilitate proper re-entry detection for multiple system operators running parallel sessions, the re-entry detection process compares each detected face against face exemplars for all users whose re-entry timers have not yet expired. The comparison may be based, for example, on eye regions, and may require image normalization and rotation into a standard form so that the line joining the two eyes is horizontal and that the height and width of image are of a fixed size. Alternatively, to facilitate fast re-authentication, face posture may be computationally taken into account when comparing the images, using previously gathered face templates. If the detected face is similar, according to some similarity criterion, to the face exemplar of any of the users with still-active re-entry timers, that user's session is restored.

Figure 4:
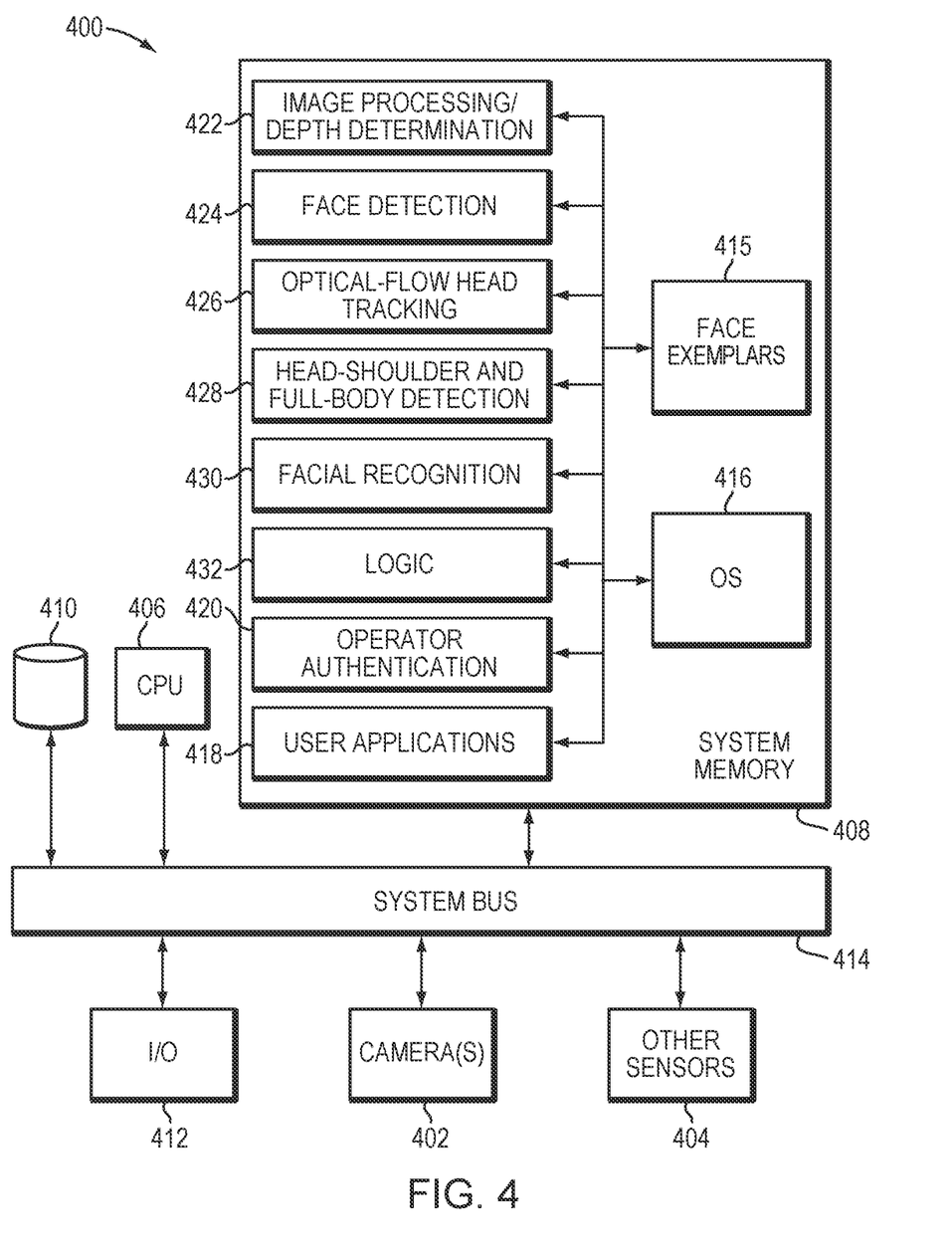
FIG. 4 is a block diagram illustrating a system for operator detection and tracking in accordance with various embodiments.

FIG. 4 illustrates an exemplary secure system 400 with integrated operator detection and tracking functionality implementing the method described above. The system 400 includes one or more depth-sensitive cameras 402, or conventional cameras or sensors 404 that may be operated to provide depth information (e.g., by computational processing of overlapping images obtained from different vantage points), that are co-located with the system to be monitored. Further, it includes a computer having a processor (CPU) 406 on which commands and computational requests are processed, volatile system memory 408 (e.g., random-access memory (RAM)) and one or more non-volatile storage media 410 (such as, e.g., hard drives, network drives, CD-ROMs, DVDs, or backup tapes) for long-term storage, input/output devices 412 (such as, e.g., a keyboard and computer mouse), and a system bus 414 that facilitates communication between the various components. During use, the memory 408 may store the camera images and associated data, as well as face exemplars 415 (i.e., face images or data derived therefrom). In some embodiments of the invention, a stable log stores face exemplars on permanent storage media 410 to avoid depending on the continuous operation of the computer to maintain a readable copy of data stored on it. The face exemplars may be associated, e.g., in a relational database, with authorized operator identities.

The memory 408 further stores instructions, conceptually illustrated as a group of modules, that control the operation of CPU 406 and its interaction with the other hardware components. An operating system 416 directs the execution of low-level, basic system functions such as memory allocation, file management and operation of mass storage devices 410. At a higher level, various service-application modules provide one or more end-user applications 418 accessible by authorized operators, as well as program modules that facilitate and control access to the system based, at least in part, on image streams of the detection zone. Specifically, the system memory 408 may store a conventional authentication application 420 (which may be part of the computer's operating system or dedicated authentication software); an image-processing application 422 for pre-processing the raw image frames provided by the camera (and or other sensor data) and computing depth values associated with objects captured therein; modules for implementing the algorithms for face detection (424), head tracking (e.g., using optical-flow analysis) (426), head-shoulder and full-body detection (428), and facial recognition (430) for detecting re-entry events and/or identifying an operator among multiple authorized users; as well as a logic module 432 that makes decisions, based on the output of these algorithms, regarding log-in, walk-away, and re-entry events. Of course, the depicted grouping into modules is exemplary only, and the various functionalities may instead be organized in many alternative ways. The modules may be programmed in any suitable programming language (or multiple different languages), including, without limitation, high-level languages such as C, C++, C #, Ada, Basic, Cobra, Fortran, Java, Lisp, Perl, Python, Ruby, or Object Pascal, or low-level assembly languages.

Additional embodiments and features of presence detection systems and methods in accordance herewith can be found in U.S. patent application Ser. No. 12/547,100, filed on Aug. 25, 2009, which is hereby incorporated herein by reference.

Although the invention has been described herein with respect to specific embodiments and details, these embodiments and details are illustrative only, and not intended to limit the scope of the invention. Rather, various modifications, alternative embodiments, and different combinations of features that solve the problems addressed by the invention, or achieve its advantages, in a similar manner, without departing from the spirit and scope of the invention, will be readily apparent to a person of skill in the art.

What is claimed is:

1. A computer-implemented method for monitoring use of a secure system, the method comprising:
   defining a detection zone extending from an operator terminal of the secure system to a depth boundary spaced apart from the operator terminal and corresponding to a distance from the operator terminal beyond which an operator cannot interact with the secure system;
   detecting one or more operators associated with the secure system;
   for each of the operators, (i) authenticating the operator and initiating a session for the operator on the operator terminal, (ii) detecting a walk-away event of the operator using a depth-sensing camera system co-located with the operator terminal based on the operator being detected beyond the depth boundary, and (iii) responsive to the walk-away event is being detected, starting a re-entry timer associated with the operator;
   upon expiration of the re-entry timer associated with a respective operator, closing the session of the respective operator and logging the respective operator out of the secure system;
   detecting a face within the detection zone using the depth-sensing camera system;
   determining that the face corresponds to the respective operator; and
   when the re-entry timer associated with the respective operator has not expired and the detected face corresponds to the respective operator, re-validating the session for the respective operator on the operator terminal without requiring additional authentication.

2. The method of claim 1, further comprising:
   determining if the detected face corresponds to an operator associated with an unexpired re-entry timer; and
   comparing the detected face only to face exemplars of operators having unexpired re-entry timers.

3. The method of claim 1, wherein detecting a walk-away event comprises using the depth-sensing camera to track a distance from the operator terminal to the operator and determining when the distance extends beyond a walk-away threshold distance.

4. The method of claim 3, wherein the walk-away threshold distance within the detection zone is smaller than the distance to the distance of the depth boundary of the detection zone.

5. The method of claim 1, wherein detecting the face within the detection zone using the depth-sensing camera system comprises:
   using the depth-sensing camera system to acquire images of one or more objects;
   using the depth-sensing camera to measure distances from the operator terminal to the one or more objects; and
   computationally determining whether any of the one or more objects is within the detection zone and is a face.

6. The method of claim 5, wherein computationally determining whether any of the one or more objects is within the detection zone and is a face comprises:
   using a face-finding algorithm to detect faces in the images and thereafter computationally determining, based on the distances measured using the depth-sensing camera, which, if any, of the detected faces are present within the detection zone while excluding detected faces disposed at distances, measured using the depth-sensing camera, which are beyond the depth boundary.

7. The method of claim 1, wherein each operator is authenticated via at least one of a password, authentication card, or token.

8. The method of claim 1, wherein detecting the face within the detection zone comprises analyzing relative depth information measured with the depth-sensing camera to discriminate between faces and two-dimensional images thereof.

9. The method of claim 1, further comprising, after authenticating each user, acquiring one or more face exemplars of the user using the depth-sensing camera system and saving the one or more face exemplars.

10. The method of claim 9, further comprising indexing the face exemplars based, at least in part, on face posture as determined from three-dimensional information contained therein.

11. An access-control system for monitoring use of a secure system, the system comprising:
    a depth-sensing camera system co-located with an operator terminal of the secure system; and
    a computational facility including a processor and associated memory, the memory storing instructions, for execution by the processor, for:
    defining a detection zone extending from an operator terminal of the secure system to a depth boundary spaced apart from the operator terminal and corresponding to a distance from the operator terminal beyond which an operator cannot interact with the secure system;

detecting one or more operators associated with the secure system;

for each of the operators, (i) authenticating the operator and initiating a session for the operator on the operator terminal, (ii) detecting a walk-away event of the operator using the depth-sensing camera system based on the operator being detected beyond the depth boundary, and (iii) responsive to the walk-away event being detected, starting a re-entry timer associated with the operator;

upon expiration of the re-entry timer associated with a respective operator, closing the session of the respective operator and logging the respective operator out of the secure system;

detecting a face within the detection zone using the depth-sensing camera system;

determining that the face corresponds to the respective operator; and when the re-entry timers associated with the respective operator has not expired and the detected face corresponds to the respective operator, reactivating re-validating the session for the respective operator on the operator terminal without requiring additional authentication.

12. The system of claim 11, wherein the instructions stored in the memory are further for determining if the detected face corresponds to an operator associated with an unexpired re-entry timer and comparing the detected face only to face exemplars of operators having unexpired re-entry timers.

13. The system of claim 11, wherein the instructions stored in the memory for detecting a walk-away event comprise instructions for using the depth-sensing camera to track a distance from the operator terminal to the operator and determining when the distance extends beyond a walk-away threshold distance.

14. The system of claim 13, wherein the walk-away threshold distance within the detection zone is smaller than the distance to the distance of the depth boundary of the detection zone.

15. The system of claim 11, wherein the instructions stored in the memory for detecting the face within the detection zone using the depth-sensing camera system comprise instructions for:

using the depth-sensing camera system to acquire images of one or more objects;

using the depth-sensing camera to measure distances from the operator terminal to the one or more objects; and computationally determining whether any of the one or more objects is within the detection zone and is a face.

16. The system of claim 15, wherein the instructions for computationally determining whether any of the one or more objects is within the detection zone and is a face comprise instructions for:

using a face-finding algorithm to detect faces in the images and thereafter computationally determining, based on the distances measured using the depth-sensing camera, which, if any, of the detected faces are present within the detection zone while excluding detected faces disposed at distances, measured using the depth-sensing camera, which are beyond the depth boundary.

17. The system of claim 11, wherein each operator is authenticated via at least one of a password, authentication card, or token.

18. The system of claim 11, wherein the instructions stored in the memory for detecting the face within the detection zone comprise instructions for analyzing relative depth information measured with the depth-sensing camera to discriminate between faces and two-dimensional images thereof.

19. The system of claim 11, wherein the instructions stored in the memory further comprise instructions for, after authenticating each user, acquiring one or more face exemplars of the user using the depth-sensing camera system and saving the one or more face exemplars.

20. The system of claim 19, wherein the instructions stored in the memory further comprise instructions for indexing the face exemplars based, at least in part, on face posture as determined from three-dimensional information contained therein.

* * * * *